W. P. ELLIOTT, Jr.
SWINGING BELL.
APPLICATION FILED JULY 10, 1908.
927,133.
Patented July 6, 1909.
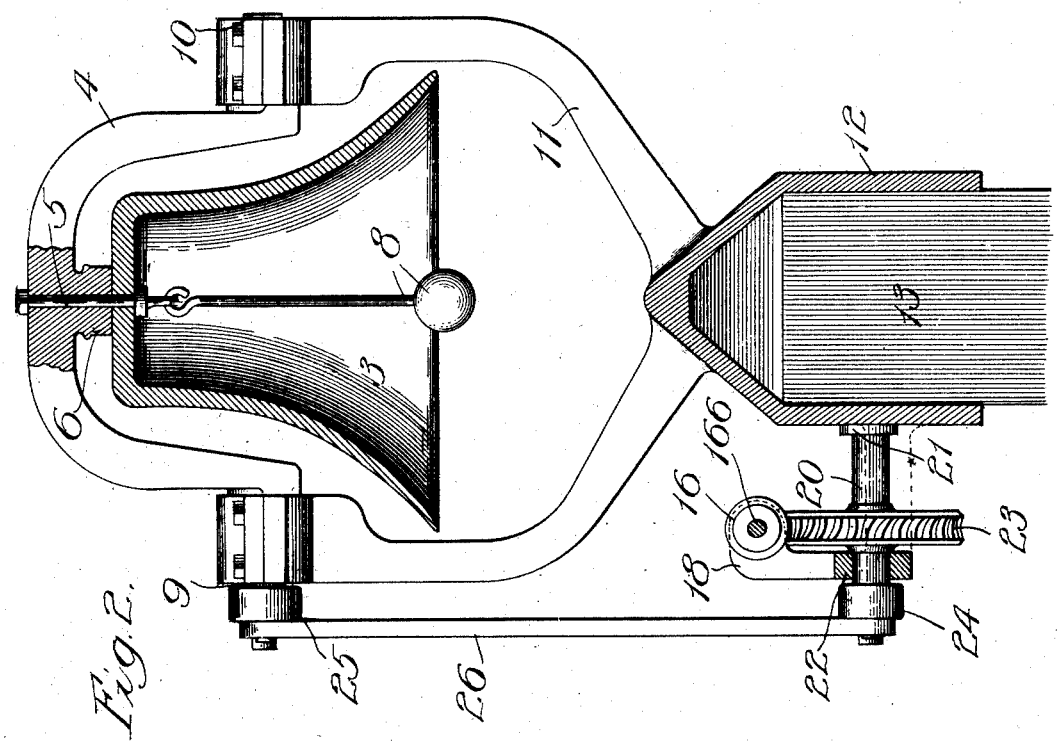
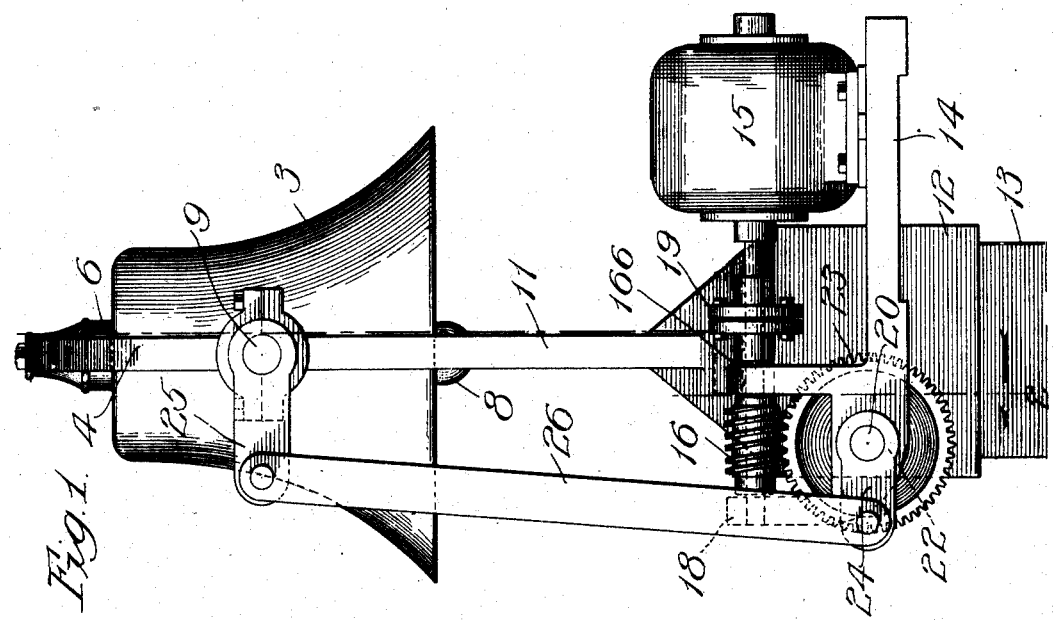
Witnesses:
John Enders
Chas. H. Buell
Inventor:
William P. Elliott, Jr.
By Dyrenforth, Lee, Chritton & Wiles
Attys.

UNITED STATES PATENT OFFICE.

WILLIAM P. ELLIOTT, JR., OF LA GRANGE, ILLINOIS, ASSIGNOR OF ONE-HALF TO WILLIAM P. ELLIOTT, OF LA GRANGE, ILLINOIS.

SWINGING BELL.

No. 927,133.           Specification of Letters Patent.           Patented July 6, 1909.

Application filed July 10, 1908. Serial No. 442,844.

*To all whom it may concern:*

Be it known that I, WILLIAM P. ELLIOTT, Jr., a citizen of the United States, residing at La Grange, in the county of Cook and State of Illinois, have invented a new and useful Improvement in Swinging Bells, of which the following is a specification.

The object of my invention is to provide an improved construction of the connection between a swinging bell and a motor for ringing it which shall render the strokes of the bell reliably regular and uniform.

I have devised my improvement more especially for alarm-bells at railroad-crossings, though it adapts them for use for any purpose to which a swinging bell is applicable.

In the accompanying drawing, Figure 1 is a view in side elevation of a bell equipped with my motor-driven improvement, and Fig. 2 is a section on line 2, Fig. 1.

The bell 3 is rigidly supported in a yoke 4 by a bolt 5 passing through the yoke and a central boss 6 therein and through the crown of the bell, within which the bolt has an eye 7 for suspending pivotally the stem of the swinging tongue 8. The ends of the yoke 4 are extended laterally to form trunnions 9 and 10 journaled in bearings on the upper ends of a rigid yoke 11 formed with a socket 12 extending from its base to seat upon the upper end of a post 13 affording a stable support for the mechanism.

The parts thus far described present no important features of novelty.

On the socket 12, or formed integral with it, is a bearing-frame 14 involving a platform for supporting a motor 15, preferably an electric motor as represented. A worm-shaft 166 carrying a worm 16 is journaled in bearings 17 and 18 on the frame 14 and has a coupling-connection 19 with the motor-shaft to adapt the motor to be readily removed for repair or replacement without disturbing the rest of the mechanism. A stub-shaft 20 is journaled in a bearing 21 on a side of the socket 12 and in a bearing 22 on the frame 14 and carries a worm-wheel 23 meshing with the worm 16. On the shaft 20 is secured a crank-arm 24 and on the trunnion 9 is secured a relatively longer crank-arm 25; and these two crank-arms are connected by a pitman 26.

The purpose of the driving mechanism is to slowly swing the bell 3 for ringing it with regular strokes, and it may, for that purpose, be any other suitable mechanism than the electric motor and worm-gear actuated by it. When the motor is actuated, which may be done automatically by a moving train, or by hand, the driving member 16 actuates the driven member 23 of the driving movement to slowly rotate the crank 24 to reciprocate the pitman and move the longer crank 25 back and forth to swing the bell 3 and ring it with a regular and uniform stroke.

What I claim as new and desire to secure by Letters Patent is—

In combination, a bell-support, a bell on trunnions on said support, a frame in said support involving a motor-platform and bearings, a motor on said platform, a worm-gear connected with said motor and journaled in said bearings, a crank on the worm-wheel shaft of said gear, a relatively longer crank on one of said trunnions, and a pitman connecting said cranks at their free ends, for the purpose set forth.

WILLIAM P. ELLIOTT, JR.

In presence of—
   K. M. CORNWALL,
   R. A. SCHAEFER.